Patented June 5, 1945

2,377,647

UNITED STATES PATENT OFFICE 2,377,647

ADHESIVE MATERIAL

Emile Pragoff, Jr., Wilmington, Del., assignor to Hercules Powder Company, Wilmington, Del., a corporation of Delaware No Drawing. Application June 8, 1942, Serial No. 446,290

10 Claims. (Cl. 260—755)

This invention relates to adhesives and more particularly to adhesives of the rubber base, pressure-sensitive type useful in the preparation of adhesive tapes, masking tapes, and the like. It also relates to adhesive tapes prepared with the adhesives.

Pressure-sensitive adhesives of the type utilized in adhesive tape, masking tape, Scotch tape, and the like, have the property of forming an adherent bond without the use of heat or solvents. At the same time, they are removable with the tape on which they are applied without marring or leaving soiled the surface which they have covered. Adhesives of this type have a very particular set of requirements. Necessarily, they combine a high degree of tack with carefully controlled cohesion and toughness within the adhesive mass.

Most pressure-sensitive adhesives are based on rubber compositions in which the rubber is modified by a resin. The rubber provides the necessary cohesion but must be modified to develop in combination the desired plastic properties and tackiness. The modification must lead to the desired plasticity and tack without making the composition mushy or imparting to the composition a tendency to string when the adhesive is removed from a surface as when adhesive tape is pulled from a roll. Heretofore, the resinous modifier has been a coumarone-indene resin, rosin, ester gum or hydrogenated rosin.

Pressure-sensitive rubber adhesives made with these modifiers have been unsatisfactory in two chief respects. First, the adhesive material has, in many cases, aged very poorly in that the material became tough and hard with loss of the necessary tackiness in a relatively short period of time. This difficulty has been very noticeable when using coumarone-indene resins, rosin, and ester gum, and has been alleviated to some extent where such resins in hydrogenated form have been employed. Second, with all rosins heretofore utilized, the initial tack of the adhesive has been less than desired for a given state of cohesion. It will be appreciated that tackiness can be increased to some extent by softening the plastic mass but to obtain the desired high state of tackiness would require softening to an extent at which the mass becomes mushy or stringy due to loss of internal cohesion, thus leading to a condition in which adhesives remain on a surface when attempts are made to remove adhesive tape, masking tape, and the like. It has, therefore, been desirable to bring about an improvement in tackiness without decreasing the cohesion of the mass materially.

In accordance with this invention, pressure-sensitive compositions which are stable with age, which are highly tacky, and which are of satisfactory cohesiveness with respect to a given tackiness, are obtained by compounding rubber with a rosin derivative containing an appreciable proportion of dehydrogenated rosin acid groups in a ratio of rubber to such a rosin derivative between about 40 to 60 and about 80 to 20 and including in the composition a softener for the rubber-rosin derivative mixture in an amount which is sufficient to develop, bring out, or increase the tackiness thereof but which is insufficient to reduce the property of cohesion to an extent in which the final composition is mushy or in which it strings upon being pulled away from a surface with which it has been in contact. The rosin derivative containing an appreciable proportion of dehydrogenated rosin acid groups is a dehydrogenated rosin acid itself, dehydrogenated rosin, a disproportioned rosin acid, "Hyex" rosin, a "Hyex" rosin acid, disproportionated rosin, pseudopimaric acid, pyroabietic acid, a mixture of such rosins or of such acids, an ester of one or more of these rosins or of these acids or a mixture of esters of the rosins or of the acids.

In accordance with this invention, pressure-sensitive adhesive tape and adhesive sheeting is obtained by coating a pressure-sensitive adhesive of the type described on sheeting, webs or strips of flexible materials such as cloth, paper, and films of regenerated cellulose, cellulose derivatives, rubber hydrochloride, and the like.

The adhesive compositions in accordance with this invention and adhesive sheeting prepared therefrom may best be described by specific embodiments thereof in the examples which follow. The compositions were prepared by breaking down crepe rubber for 20 minutes at 150° F. on a two-roll mill, using 75 cuts and turnbacks and then sheeting. Weighed portions of the rubber were then worked on the rolls for 5 minutes at friction heat (150° F.), the rosin derivative added in 10 minutes of rolling, and the filler in 10 more minutes. Softener was milled in last over a period of 5 minutes. Compositions of Table I illustrate examples found suitable; parts are by weight.

Table I

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Hyex rosin | 20 | 60 | | | | | 50 | | | 45 | 30 | |
| Glyceryl ester of Hyex rosin | | | | 50 | | | | | | | | |
| Diethylene glycol ester of Hyex rosin | | | | | 50 | | | | | | | |
| Dehydrogenated rosin (rosin heated with iodine) | | | 50 | | | | | 50 | | 30 | | |
| Glyceryl ester of dehydrogenated rosin | | | | | | | | | 50 | | | |
| Pseudopimaric acid | | | | | | 40 | | | | | | |
| Hyex rosin methyl ester | | | | | | | | | | | | 30 |
| Crepe rubber | 80 | 40 | 50 | 50 | | 60 | 50 | 50 | 50 | 25 | 100 | 70 |
| Butyl rubber | | | | | 50 | | | | | | | |
| Lanolin | 25 | 20 | | 30 | 10 | 20 | 50 | 40 | | 20 | | 20 |
| Refined mineral oil | | | 20 | | | 10 | | | | | 30 | |
| Hydrogenated cottonseed oil | | | | | | | | 15 | | | | |
| Zinc oxide | 10 | 12 | 20 | 10 | 10 | 10 | 15 | 15 | 10 | | 25 | 15 |
| Lithopone | 30 | 35 | 20 | 35 | 30 | 35 | 45 | 35 | 30 | | 75 | 35 |

The compositions were applied in benzol solution, at a concentration giving a readily workable consistency, to paper, to regenerated cellulose and to muslin. For example, the compositions of Examples 2, 3, 4, 7, 8 and 10 were dissolved in 60 parts of benzene and applied as coatings.

Muslin tapes so prepared were exposed 24 hours to ultraviolet light. Tack was retained in all cases. There was only slight darkening of the composition. Tapes coated with like compositions, using rosin instead of the rosin derivative indicated compounds discolored considerably and lost nearly all tack. Aging for 25 days in open air give similar but somewhat less drastic results.

Further examples are given in Table II with test results giving comparisons with similar compositions made with hydrogenated rosin. In all examples of Table II, 50 parts of the rosin derivative specified was milled with 50 parts of crepe rubber, 12 parts of zinc oxide and 38 parts of lithopone in the manner described for the previous examples. Lanolin was used as the softener and varied as indicated. Tackiness by penetrometer is in readings of thousandths of an inch using 100 grams weight on a Robert's No. 2 needle for 5 seconds in a standard penetrometer.

Table II.—Tack by penetrometer

| Rosin derivative used | Softener used in per cent of rubber+rosin derivative | | | |
|---|---|---|---|---|
| | 0% | 20% | 30% | 40% |
| Hydrogenated rosin | 62 | 46 | 53 | 89 |
| Dehydrogenated rosin (Galex-rosin heated with iodine) | 34 | 107 | 209 | 304 |
| Hyex rosin | 33 | 99 | 124 | 167 |

It will be noted that with equal parts of resin and rubber as in Table II compositions, the tack is relatively low. Softener has little effect until in very large amounts when using hydrogenated rosin. However, the softener is very effective with dehydrogenated rosin and provides a very much tackier composition than the corresponding hydrogenated rosin composition in every case. Films of the various compositions on glass plates tested for tack by merely touching gave results in line with the penetrometer tack readings.

Films on glass cast from solutions of compositions used in Table II in equal quantities of carbon tetrachloride and drying for 48 hours were tested for toughness of bond. Tapes one by two inches of light duck were rolled into the 0.005 inch dried films by rolling five times with a one kilogram weight. The bond was aged 48 hours at 70° F. and 65% relative humidity. The force in pounds required to pull the tape from the glass is recorded in Table III.

Table III.—Strength of bond

| Rosin derivative used | Softener used in percent of rubber+rosin derivative | | |
|---|---|---|---|
| | 20% | 30% | 40% |
| Hydrogenated rosin | 23 | 21 | 18 |
| Hyex rosin | 30 | 24 | 19 |

It will be noted that the Hyex rosin gave bonds of considerably greater strength than the hydrogenated rosin; yet, as shown in Table II, the tackiness was greater.

It has been found that the rubber utilized in the compositions of the present invention may be a natural rubber in the form of crepe, smoked sheets, latex (usually coagulated before use), or it may be a synthetic rubber such as those derived by the polymerization or copolymerization with modifiers of butylene, buta-diene, buta-diene derivatives, and the like to form rubbery elastomers. Preferably, pale crepe rubber is utilized. Preferably, the rubber is broken down by milling on the usual rubber rolls to some extent before it is compounded with the other ingredients of the composition. However, it has been found that less milling of the rubber is necessary than is usually required to obtain the desired compatibility with the resinous component.

The rosin derivative which is utilized to coact with the rubber to bring about a desirable state of plasticity and to bring about tackiness in the mass is characterized by an appreciable proportion of dehydrogenated rosin acid groups. The various derivatives which have been mentioned and which are illustrated in the examples are so characterized. By dehydrogenated rosin acid is meant a rosin acid having at least two less hydrogen atoms per molecule than abietic acid, sapinic acid, or pimaric acid, all of which have the formula $C_{20}H_{30}O_2$. The dehydrogenated rosin acid group may be present in the form of the carboxylic acid or in the form of an ester of the carboxylic acid. In most cases, the dehydrogenated acid or acid group will contain two less hydrogen atoms than the rosin acid (abietic, sapinic, pimaric, etc.) and will, thus, be characterized by one additional double bond. However, it may contain less hydrogen.

It has been found that the dehydrogenated rosin acid group leads to a highly stable adhesive possibly resulting from a protective action in combination with a high stability for the group itself. In addition, it leads to an improved tackiness which is believed to be brought about by an improvement in compatibility of the group with rubber as compared with other resins such as rosin, ester gum, hydrogenated rosin, and the like. To obtain the desired properties, the rosin derivative utilized should contain at least 30% by weight of dehydrogenated rosin acid groups. This proportion is based on the total content of rosinyl groups present so that in the case of esters the percentage represents the quantity of the acid groups on the basis of the acid groups present in the esters, whether esterified or not; the proportion of dehydrogenated rosin acid groups may be determined as hereinafter specified.

It will be appreciated that pure or substantially pure dehydrogenated rosin acids or their esters may be employed. However, it is not essential that the rosin derivative consist entirely of such acids or their esters. Dilution to the extent previously indicated with rosin acids or rosin acid esters is possible but it will be appreciated that the greater the content of normal rosin acids, the lower will be the stability of the product. Dilution with hydrogenated rosin acids or their esters is less serious in that such materials age reasonably well. However, the beneficial results of the present invention are greatest with the least dilution of the dehydrogenated rosin acid groups.

Rosin acids in the form of relatively pure acids or in the form of rosin itself (either gum or wood rosin may be used) may be converted into dehydrogenated derivatives for use in the present compositions by several methods. For example, the rosin acid or esters thereof may be heated for one to two hours at 150 to 200° C. with a dehydrogenating catalyst such as iodine or sulphur, in a quantity 0.5 to 4% of the rosin acid. Alternatively, the rosin, rosin acid, or ester, may be dehydrogenated or disproportionated or both reactions may be carried out by heating for one to four hours at 180 to 245° C. with a hydrogenation catalyst such as nickel, platinum, or palladium, in suspension, or an inert support, or on an activated support such as activated carbon, activated alumina, activated silica gel, and the like, under conditions at which the material cannot react with any added substances. Thus, the treatment may involve treatment under hydrogenation conditions in the absence of any added hydrogen.

Examples of suitable dehydrogenated rosin acid group containing materials are the rosins, rosin acids, and esters of rosin acids in which the apparent unsaturation thereof has been decreased under conditions adapted to producing intra- and inter-molecular rearrangement of hydrogen atoms in accordance with the processes disclosed in U. S. patents, No. 2,154,629 and No. 2,130,997, issued April 18, 1939, and September 10, 1938, to E. R. Littmann. Such products are known as "Hyex" compounds and the reaction by which they are produced as the "Hyex" reaction and they will be referred to in this manner herein and in the claims. Pyroabietic acid, which is rich in dehydroabietic acid, is also a suitable rosin derivative for the adhesives of the present invention. It may be prepared by heating a rosin or a rosin acid for one to four hours at 260 to 315° C. The pseudopimaric acid which is described in U. S. Patent No. 2,072,628, is similarly suitable.

It will be noted that Examples 1, 2, 3, 6, 8, and 10-11 illustrate the use of dehydrogenated rosin acids. However, as shown by Examples 4, 5, 9 and 12, esters of such acids are equally suitable. The esters may be esters of polyhydric alcohols such as ethylene glycol, diethylene glycol, glycerol, diglycerol, erythritol, pentaerythritol, dipentaerythritol, sorbitol, etc., or they may be esters of monohydric alcohols such as benzyl, methyl, ethyl, butyl, lauryl, and methoxyethyl alcohol.

The rosin derivative containing the dehydrogenated rosin acid groups will be compounded with the rubber in a ratio of the rubber to the rosin derivative between about 40 to 60 and about 80 to 20, preferably between 45 to 55 and 60 to 40. The ranges are required to obtain the desired combination of tack and cohesion after addition of softeners.

The rosin derivative containing dehydrogenated rosin acid groups, has, to a limited extent, a plasticizing effect upon the rubber of the composition. However, its chief function is to form a unique plastic structure with the rubber and to bring about the desired tackiness in this structure. For some purposes, the tacky plastic of rubber and the rosin derivative may be used without further modification. However, it has been found that the improved high tack desired requires modification with a softener compatible with the rubber-rosin derivative plastic. It has been found that softeners greatly increase the tackiness of such compositions. Suitable softeners which have been found satisfactory in the present compositions are, for example, lanolin, mineral oil, dibutyl phthalate, hydrogenated cottonseed oil, hydrogenated methyl abietate, glycerol tripropionate, and the like. The quantity of softener added is a quantity sufficient to increase the tackiness of the composition, but less than a quantity which brings about a mushy condition in which portions of adhesive stick when the adhesive is pulled away from a surface to which it is temporarily bonded; and less than a quantity which brings about a condition in which the adhesive strings upon being pulled away from a surface with which it has been in contact, as, for example, when a masking tape is stripped after use or, for example, when an adhesive tape is unrolled. It has been found that at least a quantity of 10% by weight of softener is required. At 20% and above, the composition is markedly superior in tack to unsoftened compositions and also to softened compositions in which rosin or hydrogenated rosin are used. Preferably, between 20% and 40% of softener is used. More than about 50% leads to a mushy plastic. Softener percentages are of the combined weight of the rubber and the rosin derivative used.

Where desired, the adhesive compositions in accordance with this invention may contain inert solid fillers such as zinc oxide, barium sulfate, antimony oxide, lithopone, clay, chalk, and the like. The inert solid fillers are not essential but they extend the adhesive and thereby lower its cost and, in addition, in some cases, they render the composition firmer and shorter so that tendency to string is decreased. Fillers will ordinarily comprise less than 45% by weight of the entire non-volatile contents of the adhesive composition. Waxy substances may also be included if desired. For example, paraffin, carnauba wax, Japan wax, stearic acid, cetyl alcohol, stearyl alcohol, montan wax and the like may be included. Waxes improve the ease of application of the adhesive in the molten form in manufacturing adhesive sheets and tapes but they should be limited to a quantity less than 20% by weight of the non-volatile plastic components of the composition since they tend to decrease tackiness.

As shown by the examples, the adhesive compositions in accordance with this invention are readily prepared by compounding on a rubber mill of the two-roll type. Usually, the rubber will be broken down, for example, for 20 to 35 minutes at the natural friction temperature of the mass and the other components will then be rolled. Usually, the temperature is held between about 60 and about 100° C. during the milling operation. It should be kept in mind that excessive periods of milling reduce the cohesive strength contributed to the plastic mass by the rubber and, hence, milling should be limited to the shortest period practical for bringing about a uniform dispersion of the components of the mixture. In preparing the adhesives according to the present invention, the rubber is desirably milled for periods shorter than would be necessary using other resins (such as rosin, ester gum, hydrogenated rosin, coumarone resins, etc.) under like conditions.

The adhesive composition may be applied to suitable sheeting such as cotton sheeting, paper, creped paper, cellulose and cellulose derivative sheeting, and the like, by spreading in the molten state, by calendering in the semi-molten state, by coating in the form of solutions and solvents such as, for example, benzene, toluene, butyl acetate, and carbon tetrachloride, or by other methods of spreading.

The adhesive compositions and adhesive sheeting prepared therewith in accordance with this invention have the advantage of retaining tackiness, and retaining the initial combination of toughness and softness of the material over long periods of time, as compared with similar products in which rosin, ester gum, coumarone resins, and the like are utilized instead of the rosin derivative rich in dehydrogenated rosin acid groups. This result is thought to be in part due to the stability of the deyhdrogenated rosin acid group, to a protective action on the rubber of this group, and to a modification of the nature of the plastic mass due to compatibility differences. The dehydrogenated rosin acid groups contain less hydrogen than the normal rosin acid groups and, in that sense, are more unsaturated. However, they exhibit less tendency to oxidize and, in general, will have a thiocyanogen number of 0-10 as compared with 90-100 for the normal rosin acid.

The products according to this invention exhibit high tackiness for a given cohesion, (and high cohesion for a given tackiness) as compared with similar compositions in which rosin, ester gum, hydrogenated rosin, coumarone resin, and the like, are utilized. This effect is thought to be brought about by a higher compatibility with rubber and is enhanced by the fact that less milling of the rubber is required. In addition, less added softener is required to raise the tack to a given level and this, in turn, permits more tackiness to be developed without difficulties due to stringing and mushiness of the resulting adhesive.

The content of dehydrogenated rosin groups in a rosin derivative is readily determined in the following manner. One hundred grams of the rosin derivation are dissolved in 200 cubic centimeters of carbon tetrachloride, cooled to 0° C., and 500 cubic centimeters of 95% of sulfuric acid are added with agitation. The mixture is stirred at 0-5° C. for one hour and 200 cubic centimeters more carbon tetrachloride are stirred in with one liter of ice. The precipitate which forms is filtered off and washed with a small amount of cold water. The precipitate is then added to one liter of water, boiled, acidified with hydrochloric acid, and then cooled overnight at 0-3° C. It is then filtered off, washed with a small amount of cold water and dried at 70° C. The sulfodehydroabietic acid resulting is then hydrolyzed by treatment with 60% sulfuric acid added in the proportion of 860 cubic centimeters for each 30 grams of sulfohydroabietic acid. The mixture is stirred at 133° C. for six hours, cooled, and the dehydroabietic acid is filtered off and washed with hot water. The acid is then boiled with decolorizing carbon in 2,000 cubic centimeters of alcohol and filtered hot to remove the carbon. Water is then added to the filtrate to precipitate the dehydroabietic acid which is filtered, dried, and weighed.

This application is a continuation-in-part of my copending application, Serial No. 265,521, filed April 1, 1939, now Patent No. 2,285,458, June 9, 1942.

What I claim and desire to protect by Letters Patent is:

1. An age-resistant, highly tacky, pressure-sensitive adhesive comprising rubber, a rosin derivative containing appreciable dehydrogenated rosin acid groups, said derivative being selected from the group consisting of dehydrogenated rosin acids, dehydrogenated rosin, rosin which has undergone inter- and intramolecular rearrangement in such manner that the ethylenic unsaturation thereof has been reduced, said rearrangement having been effected by treatment of the rosin with a hydrogenation catalyst in the absence of added substances capable of reducing the degree of unsaturation thereof, rosin acids which have undergone inter- and intramolecular rearrangement in such manner that their ethylenic unsaturation has been reduced, said rearrangement having been effected by treatment of the material with a hydrogenation catalyst in the absence of added substances capable of reducing the degree of unsaturation, pseudopimaric acid, pyroabietic acid, mixtures of the said rosins and acids, esters of the said rosins and acids, and mixtures of the said esters, the ratio of rubber to said rosin derivative being between 40:60 and 80:20, and lanolin in an amount between about 10% and about 50% of the combined weight of the rubber and said rosin derivative.

2. An age-resistant, highly tacky, pressure-sensitive adhesive comprising rubber, dehydrogenated rosin, the ratio of rubber to dehydrogenated rosin being between 40:60 and 80:20, lanolin in an amount between 10% and 50% of the combined weight of the rubber and dehydrogenated rosin, and zinc oxide.

3. An age-resistant, highly tacky, pressure-sensitive adhesive tape comprising cotton textile sheeting coated with an adhesive comprising rubber, a rosin derivative containing appreciable dehydrogenated rosin acid groups, said derivative being selected from the group consisting of dehydrogenated rosin acids, dehydrogenated rosin, rosin which has undergone inter- and intramolecular rearrangement in such manner that the ethylenic unsaturation thereof has been reduced, said rearrangement having been effected by treatment of the rosin with a hydrogenation catalyst in the absence of added substances capable of reducing the degree of unsaturation thereof, rosin acids which have undergone inter- and intramolecular rearrangement in such manner that their ethylenic unsaturation has been reduced, said rearrangement having been effected by treatment of the material with a hydrogenation catalyst in the absence of added substances capable of reducing the degree of unsaturation, pseudopimaric acid, pyroabietic acid, mixtures of the said rosins and acids, esters of the said rosins and acids, and mixtures of the said esters, the ratio of rubber to said rosin derivative being between 40:60 and 80:20, and lanolin in an amount between about 10% and about 50% of the combined weight of the rubber and said rosin derivative.

4. An age-resistant, highly tacky, pressure-sensitive adhesive comprising rubber and dehydrogenated rosin, the ratio of rubber to the dehydrogenated rosin being between 40:60 and 80:20, and a softener for the rubber-rosin derivative composition selected from the group consisting of lanolin, mineral oil, glycerol tripropionate, dibutyl phthalate, hydrogenated cottonseed oil and hydrogenated methyl abietate in an amount between about 10% and about 50% of the combined weight of the rubber and dehydrogenated rosin.

5. An age-resistant, highly tacky, pressure-sensitive adhesive comprising rubber, a rosin which has undergone inter- and intramolecular rearrangement in such manner that the ethylenic unsaturation thereof has been reduced, said rearrangement having been effected by treatment of the rosin with a hydrogenation catalyst in the absence of added substances capable of reducing the degree of unsaturation thereof, the ratio of rubber to said modified rosin being between 40:60 and 80:20, and a softener selected from the group consisting of lanolin, mineral oil, glycerol tripropionate, dibutyl phthalate, hydrogenated cottonseed oil and hydrogenated methyl abietate in an amount between about 10% and about 50% of the combined weight of the rubber and modified rosin.

6. An age-resistant, highly tacky, pressure-sensitive masking tape comprising paper coated with an adhesive comprising a rubber, a rosin which has undergone inter- and intramolecular rearrangement in such manner that the ethylenic unsaturation thereof has been reduced, said rearrangement having been effected by treatment of the rosin with a hydrogenation catalyst in the absence of added substances capable of reducing the degree of unsaturation thereof, the ratio of rubber to said modified rosin being between 40:60 and 80:20, and a softener for the rubber-rosin derivative composition selected from the group consisting of lanolin, mineral oil, glycerol tripropionate, dibutyl phthalate, hydrogenated cottonseed oil and hydrogenated methyl abietate in an amount between about 10% and about 50% of the combined weight of the rubber and said rosin derivative.

7. An age-resistant, highly tacky, pressure sensitive sheeting comprising a film of regenerated cellulose coated with an adhesive comprising a rubber, a rosin which has undergone inter- and intramolecular rearrangement in such manner that the ethylenic unsaturation thereof has been reduced, said rearrangement having been effected by treatment of the rosin with a hydrogenation catalyst in the absence of added substances capable of reducing the degree of unsaturation thereof, the ratio of rubber to said modified rosin being between 40:60 and 80:20, and a softener for the rubber-rosin derivative composition selected from the group consisting of lanolin, mineral oil, glycerol tripropionate, dibutyl phthalate, hydrogenated cottonseed oil and hydrogenated methyl abietate in an amount between about 10% and about 50% of the combined weight of the rubber and said rosin derivative.

8. An age-resistant, highly tacky, pressure-sensitive adhesive tape comprising cotton textile sheeting coated with an adhesive comprising a rubber, a rosin which has undergone inter- and intramolecular rearrangement in such manner that the ethylenic unsaturation thereof has been reduced, said rearrangement having been effected by treatment of the rosin with a hydrogenation catalyst in the absence of added substances capable of reducing the degree of unsaturation thereof, the ratio of rubber to said modified rosin being between 40:60 and 80:20, and lanolin in an amount between about 10% and about 50% of the combined weight of the rubber and said modified rosin.

9. An age-resistant, highly tacky, pressure-sensitive adhesive comprising a rubber, a material selected from the group consisting of rosins, rosin acids and rosin acid esters, which have undergone inter- and intramolecular rearrangement in such manner that their ethylenic unsaturation has been reduced, said rearrangement having been effected by treatment of the material with a hydrogenation catalyst in the absence of added substances capable of reducing the degree of unsaturation, the ratio of rubber to said rosin derivative being between 40:60 and 80:20, and a softener for the rubber-rosin derivative composition selected from the group consisting of lanolin, mineral oil, glycerol tripropionate, dibutyl phthalate, hydogenated cottonseed oil and hydrogenated methyl abietate in an amount between about 10% and about 50% of the combined weight of the rubber and said rosin derivative.

10. An age-resistant, highly tacky, pressure-sensitive adhesive sheeting comprising a base sheet coated with an adhesive comprising a rubber, a material selected from the group consisting of rosins, rosin acids and rosin acid esters, which have undergone inter- and intramolecular rearrangement in such manner that their ethylenic unsaturation has been reduced, said rearrangement having been effected by treatment of the material with a hydrogenation catalyst in the absence of added substances capable of reducing the degree of unsaturation, the ratio of rubber to said rosin derivative being between 40:60 and 80:20, and a softener for the rubber-rosin derivative composition selected from the group consisting of lanolin, mineral oil, glycerol tripropionate, dibutyl phthalate, hydrogenated cottonseed oil and hydrogenated methyl abietate in an amount between about 10% and about 50% of the combined weight of the rubber and said rosin derivative.

EMILE PRAGOFF, Jr.